(12) United States Patent
Abraham et al.

(10) Patent No.: US 8,921,011 B2
(45) Date of Patent: Dec. 30, 2014

(54) OPTICALLY VARIABLE DEVICE MASTERING SYSTEM, METHOD OF AUTHENTICATING ARTICLES EMPLOYING THE SAME, AND RESULTANT ARTICLE

(71) Applicant: 3dcd, LLC, Camarillo, CA (US)

(72) Inventors: Nigel C. Abraham, Highlands Ranch, CO (US); Holger Hofmann, Thousand Oaks, CA (US); Raymond L. Keating, Topanga, CA (US)

(73) Assignee: 3dcd, LLC, Denver, CO (US)

( * ) Notice: Subject to any disclaimer, the term of this patent is extended or adjusted under 35 U.S.C. 154(b) by 0 days.

(21) Appl. No.: 13/868,224

(22) Filed: Apr. 23, 2013

(65) Prior Publication Data

US 2013/0234364 A1    Sep. 12, 2013

Related U.S. Application Data

(63) Continuation of application No. 11/668,013, filed on Jan. 29, 2007, now abandoned.

(60) Provisional application No. 60/763,427, filed on Jan. 30, 2006.

(51) Int. Cl.

| | | |
|---|---|---|
| G11B 7/24 | (2013.01) | |
| G03H 1/02 | (2006.01) | |
| G03H 1/00 | (2006.01) | |
| G03H 1/08 | (2006.01) | |
| G11B 7/26 | (2006.01) | |
| G03H 1/04 | (2006.01) | |
| G03H 1/26 | (2006.01) | |
| G11B 20/00 | (2006.01) | |

(52) U.S. Cl.
CPC ............. *G03H 1/0011* (2013.01); *G03H 1/08* (2013.01); *G03H 1/0891* (2013.01); *G11B 7/261* (2013.01); *G03H 1/0244* (2013.01); *G03H 2001/0288* (2013.01); *G03H 2001/0296* (2013.01); *G03H 2001/0478* (2013.01); *G03H 2001/2615* (2013.01); *G03H 2224/04* (2013.01); *G03H 2270/22* (2013.01); *G11B 20/00608* (2013.01)
USPC ...... 430/1; 430/2; 430/321; 359/3; 369/284.1

(58) Field of Classification Search
CPC ..... G03H 1/0011; G03H 1/08; G03H 1/0891; G03H 1/0244; G03H 2001/0288; G03H 2001/0296; G03H 2001/0478; G03H 2001/2615; G03H 2224/04; G03H 2270/22; G11B 7/261; G11B 20/00608

See application file for complete search history.

(56) References Cited

U.S. PATENT DOCUMENTS 5,607,188 A * 3/1997 Bahns et al. .................. 283/113
5,843,626 A * 12/1998 Ohta et al. .................... 430/320

(Continued)

FOREIGN PATENT DOCUMENTS

| | | | |
|---|---|---|---|
| GB | 2277827 | * | 11/1994 |
| JP | 58-100235 | * | 6/1983 |

(Continued)

OTHER PUBLICATIONS

English Translation of JPO Notice of Reasons for Refusal, Japanese Patent Application No. 2008-552608, Mailing Date: Aug. 20, 2013.

*Primary Examiner* — Martin Angebranndt
(74) *Attorney, Agent, or Firm* — Eckert Seamans Cherin & Mellott, LLC; Nathaniel C. Wilks

(57) ABSTRACT

A method is provided for mastering optically variable devices (OVDs) used to authenticate optical discs. The method generally includes the steps of providing a laser beam recorder (LBR), introducing a substrate to the LBR, and exposing a portion of the substrate to the LBR. The mastering system thus includes the LBR, which has a laser that emits a beam, a processor or computer for programming or otherwise controlling the beam in order to expose the substrate and create the desired optical effect. Depending on the material used for the substrate, the exposure is then developed, if necessary, and processed to generate a master for the OVD. The OVD can then be replicated in order to provide authentic resultant products or articles, such as optical discs.

20 Claims, 6 Drawing Sheets

(56) References Cited

U.S. PATENT DOCUMENTS

| | | | |
|---|---|---|---|
| 5,978,112 A * | 11/1999 | Psaltis et al. | 359/22 |
| 6,423,478 B1 * | 7/2002 | Ha | 430/321 |
| 2001/0000746 A1 * | 5/2001 | Edwards | 430/321 |
| 2002/0036978 A1 * | 3/2002 | Shimizu | 369/275.4 |
| 2002/0191517 A1 * | 12/2002 | Honda et al. | 369/53.29 |
| 2004/0109482 A1 * | 6/2004 | Nakayama | 372/38.02 |
| 2004/0208104 A1 * | 10/2004 | Kobayashi et al. | 369/59.11 |
| 2005/0206866 A1 * | 9/2005 | Ozaki et al. | 355/53 |
| 2007/0097472 A1 * | 5/2007 | Ha | 359/35 |
| 2008/0002015 A1 * | 1/2008 | Itoga et al. | 347/224 |
| 2008/0274332 A1 * | 11/2008 | Satou et al. | 428/141 |

FOREIGN PATENT DOCUMENTS

| | | | |
|---|---|---|---|
| JP | 02-091833 | * | 3/1990 |
| JP | 04-153920 | * | 5/1992 |
| JP | 07-085506 | * | 3/1995 |
| JP | 07-262623 | * | 10/1995 |
| JP | 8287526 | | 8/1996 |
| JP | 2002203321 | | 7/2002 |
| JP | 2004-062981 | * | 2/2004 |
| JP | 2005-092935 | * | 4/2005 |
| WO | 2008/078234 | * | 7/2008 |

* cited by examiner

OPTICALLY VARIABLE DEVICE MASTERING SYSTEM, METHOD OF AUTHENTICATING ARTICLES EMPLOYING THE SAME, AND RESULTANT ARTICLE

CROSS-REFERENCE TO RELATED APPLICATIONS

This application is a continuation of Traditional U.S. application Ser. No. 11/668,013, filed on Jan. 29, 2007 now abandoned, entitled "OPTICALLY VARIABLE DEVICE MASTERING SYSTEM, METHOD OF AUTHENTICATING ARTICLES EMPLOYING THE SAME, AND RESULTANT ARTICLE," and claims the benefit of Provisional Application Ser. No. 60/763,427, filed Jan. 30, 2006, entitled "OPTICALLY VARIABLE DEVICE MASTERING SYSTEM, METHOD OF AUTHENTICATING ARTICLES EMPLOYING THE SAME, AND RESULTANT ARTICLE," both of which are hereby incorporated by reference as if fully set forth herein.

BACKGROUND OF THE INVENTION

1. Field of the Invention

The invention relates generally to optically variable devices and, more particularly, to a system and method for mastering optically variable devices utilizing a laser beam recorder. The invention further relates to the authentication of articles, such as, for example, optical discs, by employing such a system and method, and to resultant articles.

2. Background Information

An optically variable device (OVD) is a device which creates a change or shift in appearance, such as, for example and without limitation, a change in color or shape, when observed from different angles. The evolution of the OVD stems largely from the search for a mechanism to resist counterfeiting of certain articles and products. Complexity of design, difficulty in creating the 'master' OVD, and difficulty in altering the original design have evolved to make OVDs a successful tool for authenticating the article or a product from a counterfeit or "pass off."

One product which has become increasingly popular and, therefore, increasingly susceptible to counterfeiting by thieves, is the optical disc, such as, for example, compact discs (CDs) and digital versatile discs (DVDs), which are used to store data including, for example, computer software, video data such as movies, and music. To deter counterfeiting of the optical discs many methods have been proposed and used to try and authenticate them. For example, N. C. Abraham's U.S. Pat. No. 5,452,282 discloses a method of integrating holographic elements into the same layer as the data that is recorded on the optical disc. See also, N. C. Abraham's U.S. Pat. Nos. 5,533,002 and 6,160,789.

However, with the prevalence of holographic origination systems world-wide, it has now become much easier for counterfeiters to produce either real counterfeit copies, by using similar techniques to the legitimate optical disc providers, or "pass offs," which are copies made by using simpler techniques while attempting to simulate the authentic product.

There is, therefore, room for improvement in systems and methods for mastering OVDs.

There is further room for improvement in the authentication of articles and products, such as, for example, optical discs.

SUMMARY OF THE INVENTION

These needs and others are met by embodiments of the invention, which provide a system and associated method for mastering optically variable devices (OVDs) using a laser beam recorder (LBR).

Generally, the method of mastering OVDs includes the steps of providing the LBR, introducing a substrate to the LBR, and exposing a portion of the substrate to the LBR. The mastering system generally includes the LBR which has a laser that emits a beam. The beam may be programmed or otherwise controlled (e.g., without limitation, modulated) using a processor or computer, in order to expose the substrate and create the desired optical effect. The exposure is then processed, typically by developing, to generate a master for the OVD. The OVD can then be replicated in order to provide authentic resultant products or articles such as, for example, optical discs. This subsequent processing may include, for example and without limitation, various electroforming steps to produce stampers, for example, in the form of nickel plates which can then be used for replication.

In one embodiment of the invention, an optical image is designed using any known or suitable software program. The image may incorporate any known or suitable optical effect (e.g., without limitation, holograms, color effects, grating structures, 2D effects, 3D effects, animation, and transformation effects). The software translates the optical image into linear data suitable for the LBR which then exposes the data on a substrate such as, for example, a photoresist plate, a phase transition material or a nitro-cellulose lacquer, in order to form the OVD. The OVD may be simultaneously combined and/or interlaced with digital recorded data such as, for example, music or video data. The photoresist plate is then developed and processed to produce a master from which authentic articles can be replicated. In one example, authentic optical discs are injection molded to contain both the digital data and OVDs. Accordingly, a wide variety of products and articles can be authenticated in accordance with the invention by including any known or suitable optical effect or combination of optical effects.

It is, therefore, an object of the invention to provide a system and method for authenticating articles, such as, for example and without limitation, optical discs, using a laser beam recorder (LBR) or an electron beam (e-beam) equivalent of the LBR, such as, for example, an e-beam recorder.

It is another object of the invention to master optically variable devices (OVDs) using a LBR or e-beam recorder.

It is a further object of the invention to provide authentic articles, such as optical discs, which resist counterfeiting.

It is a still further object of the invention to combine optical images with digital data such as, for example, music and video data, in order to resist counterfeiting of the same.

It is yet another object of the invention to replicate authenticated articles by injection molding both digital data and OVDs.

It is another object of the invention to design an optical image using any known or suitable software program, and then translate the desired optical features to suitable layout data for execution by the LBR to create the OVD.

It is a still further object of the invention to produce one or more optical effects, relatively simple diffractive gratings, two-dimensional (2D) optical images, three-dimensional (3D) images, and/or stereograms each of which may be animated or not, and full color or not.

It is yet another object of the invention to provide an optical image that can animate (i.e., move), or morph or transform into another, different optical image when viewed from a predetermined angle.

It is another object of the invention to provide an animated movie optical image.

It is another object of the invention to provide a machine readable method of data storage apart from the usual digital pits.

It is another object of the invention to produce nondiffractive optical effects.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

For purposes of illustration, embodiments of the invention will be described as applied to optical discs, although it will become apparent that they could also be applied to produce optically variable devices (OVDs) on a wide variety of other articles and products.

As employed herein, the phrases "optical effects" and "diffractive effects," refer to the variable visual characteristics, such as, for example and without limitation, change in color, rate of color change, change in shape and/or dimension, animation, transformation from one such effect to another, and combinations thereof, which are exhibited by the OVD and thus, are observed either by the naked eye or by machine when viewing the same from a predetermined angle.

As employed herein, the term "fringes," refers to any known or suitable arrangement, pattern, or structure which is generated to produce optical effects as defined herein, and expressly include "simple fringes," such as, for example and without limitation, diffraction gratings, and "complex fringes," such as, for example and without limitation, complex zone plates which include, for example, one or more diffractive lenses in order to provide three-dimensional (3D) optical effects and imagery (e.g., without limitation, animation).

As employed herein, the term "master," refers to the fundamental structure or configuration of the OVD which is designed and created so as to resist counterfeiting. Accordingly, "mastering" refers to the process of generating the underlying particular OVD structure or optical effect thereof.

The master which is produced may comprise a single OVD element, which is either employed individually or mass reproduced, it may comprise a series or pattern multiple of OVD elements and/or a plurality of optical effects associated therewith, and it may further include a combination of digital data such as, for example, video or music data.

As employed herein, the term "optical disc," refers to any known or suitable readable data storage device which is typically, but not necessarily, generally circular in shape and expressly includes, but is not limited to, Compact Discs (CDs), Digital Versatile Discs (DVDs), Super Audio CDs (SACDs), Blu-ray Discs (BD), and High Definition Digital Versatile Discs (HD-DVDs).

As employed herein, the term "number," shall mean one or more than one (i.e., a plurality).

Figure 1:
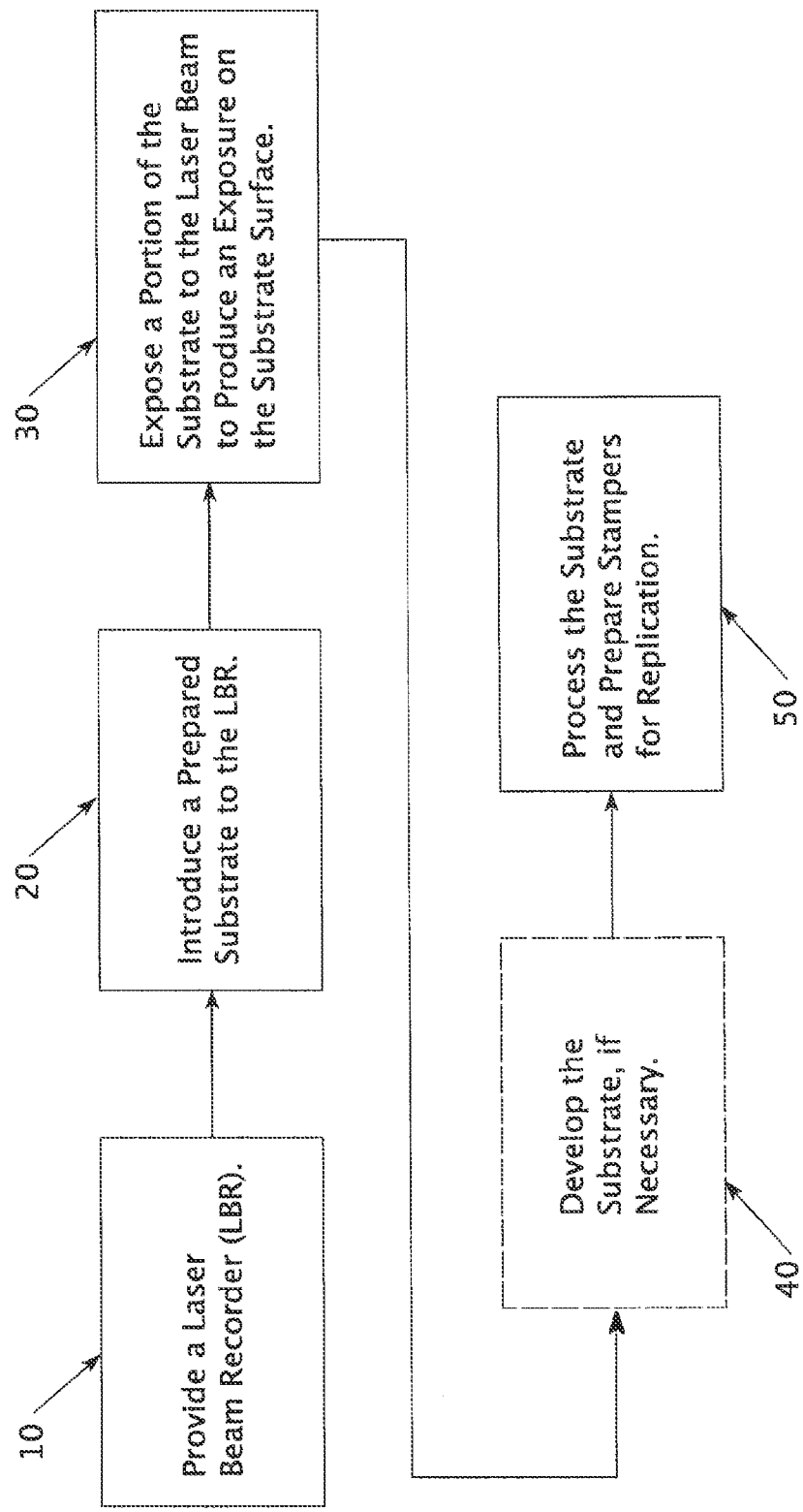
FIG. 1 is a flow diagram of a method of mastering optically variable devices in accordance with the an embodiment of the invention.
Figure 2:
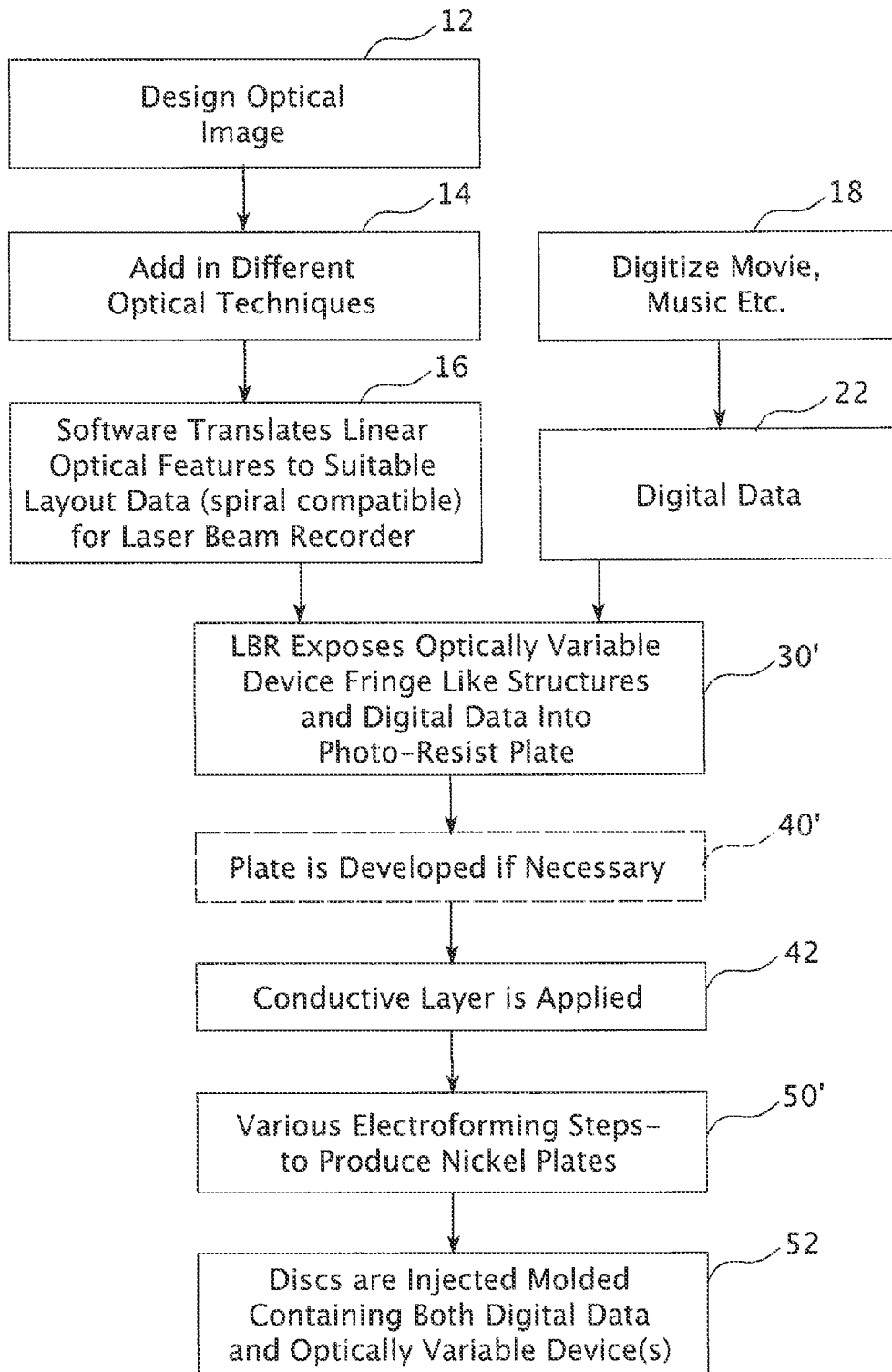
FIG. 2 is a flow diagram of a method for authenticating optical discs in accordance with an embodiment of the invention.
Figure 3:
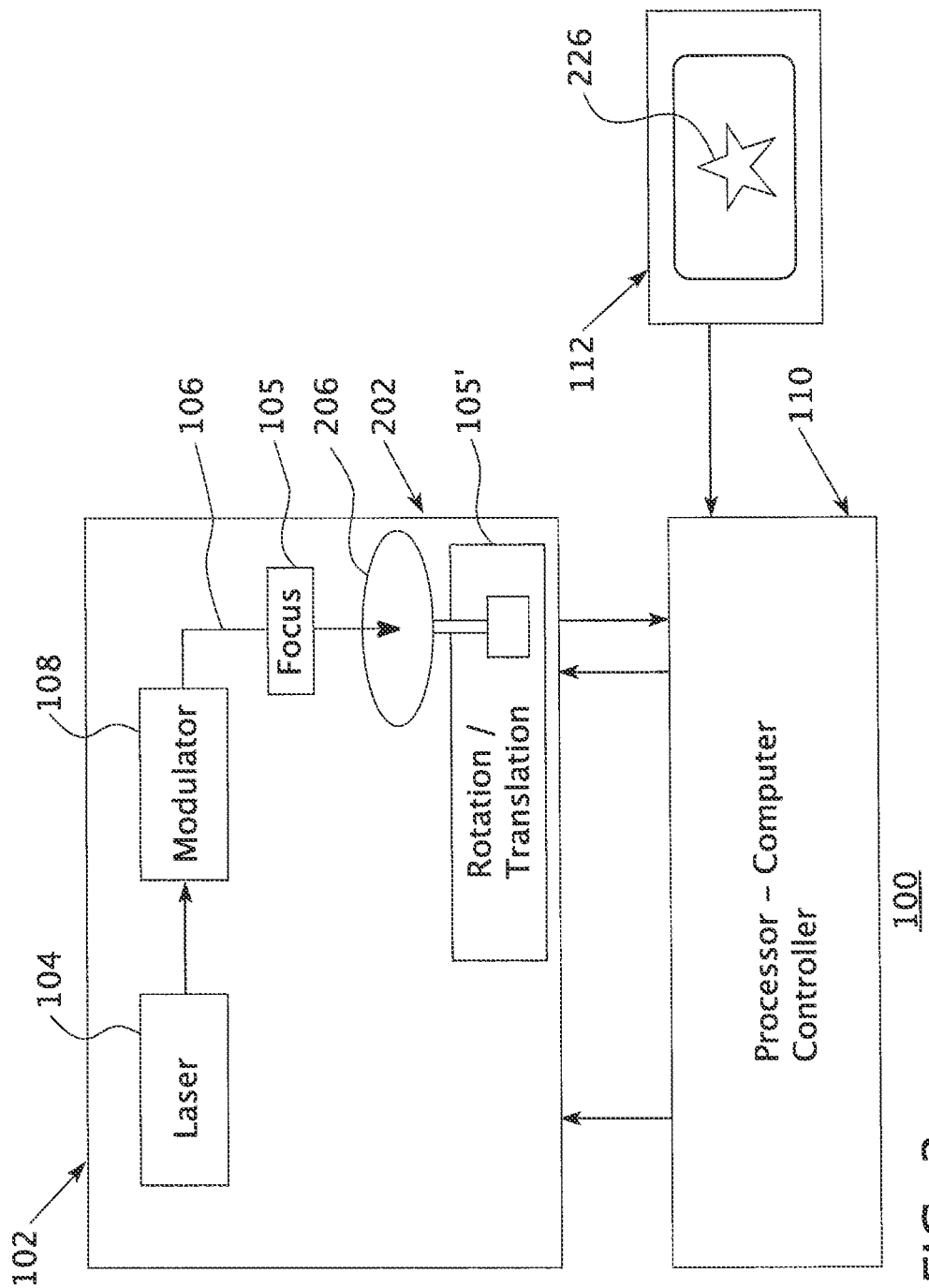
FIG. 3 is a simplified view of an optically variable device mastering system for authenticating optical discs.

FIGS. 1, 2 and 3 show the steps of a method for mastering OVDs, a method for authenticating optical discs, and an OVD mastering system 100 (shown in simplified form in FIG. 3) for authenticating optical discs, respectively, in accordance with embodiments of the invention. Generally, in a first step 10, a laser beam recorder (LBR) 102 (shown in simplified form in FIG. 3) is provided, although it will be appreciated that any known or suitable equivalent device for emitting a beam such as, for example, an e-beam recorder, could be employed. It will be appreciated that such devices, unlike known prior art recording devices which have multiple lasers with multiple wave fronts, typically employ a single laser having a single associated point of exposure. In step 20, a prepared substrate 206 coated with, for example, photoresist, a phase transition material or a nitrocellulose lacquer, is then introduced to the LBR 102. A portion of the substrate 206 is then exposed to the beam 106 of the laser 104 in order to produce an exposure, in step 30. Depending on the material used for the substrate 206, the exposure is then developed in step 40 if necessary, and processed in step 50 to generate the master 202 (FIG. 4) for the OVD. in this manner, the invention employs the laser beam recorder (LBR) 102 to record, for example, both simple (e.g., spiral 216 in FIG. 4) and complex (e.g., 3D image 220 in FIGS. 4 and 5) fringes, as defined herein, and thereby enables a wide variety of optical effects. A sampling of the vast range of optical effects made possible by the system 100 and method of the invention, will now be discussed.

As shown in FIG. 3, the mastering system 100 (shown in simplified, schematic form) generally includes the LBR 102 having a laser 104, and rotation, focus and translation, and variable aperture systems 105,105'. The laser 104 emits a beam that may be split into two beams 106 as required by the recording. Several optical modulators and deflectors 108 are included for modulating the beam or beams 106 if the laser beam itself is not modulated, and a processor 110 is provided for controlling the laser 104, rotation, focus and translation, and variable aperture systems 105,105' and modulator and/or deflectors 108, as desired. The system 100 may further include a computer 112, as shown in simplified form in the example of FIG. 3. The computer 112 can be used to program the processor 110, and to generate any known or suitable diffractive effects 216 and/or images 218, as will be described herein. A more detailed description of the operation of the mastering system 100 follows.

Generally, the LBR 102 is used to record the binary data in the optical disc master substrate 206. This is done by focusing the beam 106 down to a fine spot (e.g., without limitation, about 280 nanometers [nm] for DVD recording), which is modulated directly in the case of a solid state or diode laser or by using a modulator 108 in the case of a gas laser. The modulator 108 may be, for example, an acousto-optical modulator (AO modulator) or an electro-optic modulator (EO modulator). The modulator 108 chops (i.e., deflects, rotates the polarization, or modulates) the beam 106 to the appropriate desired lengths, suitable for a final binary code. An exposure is produce which comprises, for example, a continuous chopped spiral 216 (shown greatly exaggerated and in simplified form in the example of FIG. 4, for simplicity of illustration) having gaps 208 (i.e., lands) between each spiral revolution 209. The LBR 102 exposes onto a substrate 206 which typically, although not always, comprises a thin (e.g., about 155 nm for a CD) coating of positive photoresist 206. Before exposure, the photoresist 206, a phase transition material, a nitro-cellulose lacquer or the like, is preferably coated or sputtered onto a glass substrate or silicon wafer and the substrate 206 is exposed and subsequently developed, which removes the photoresist or phase transition material where the beam 106 (i.e., laser light) exposed the substrate 206. the case of photoresist or nitro-cellulose, which is developed, substrate 206 then has a conductive layer applied to it and, through subsequent electo-forming stages, an electroformed nickel stamper is made, which produces a mirror image duplicate of the original digital relief pattern (commonly referred to as the "pit" pattern), and is used to replicate the optical discs 200.

Figure 4:
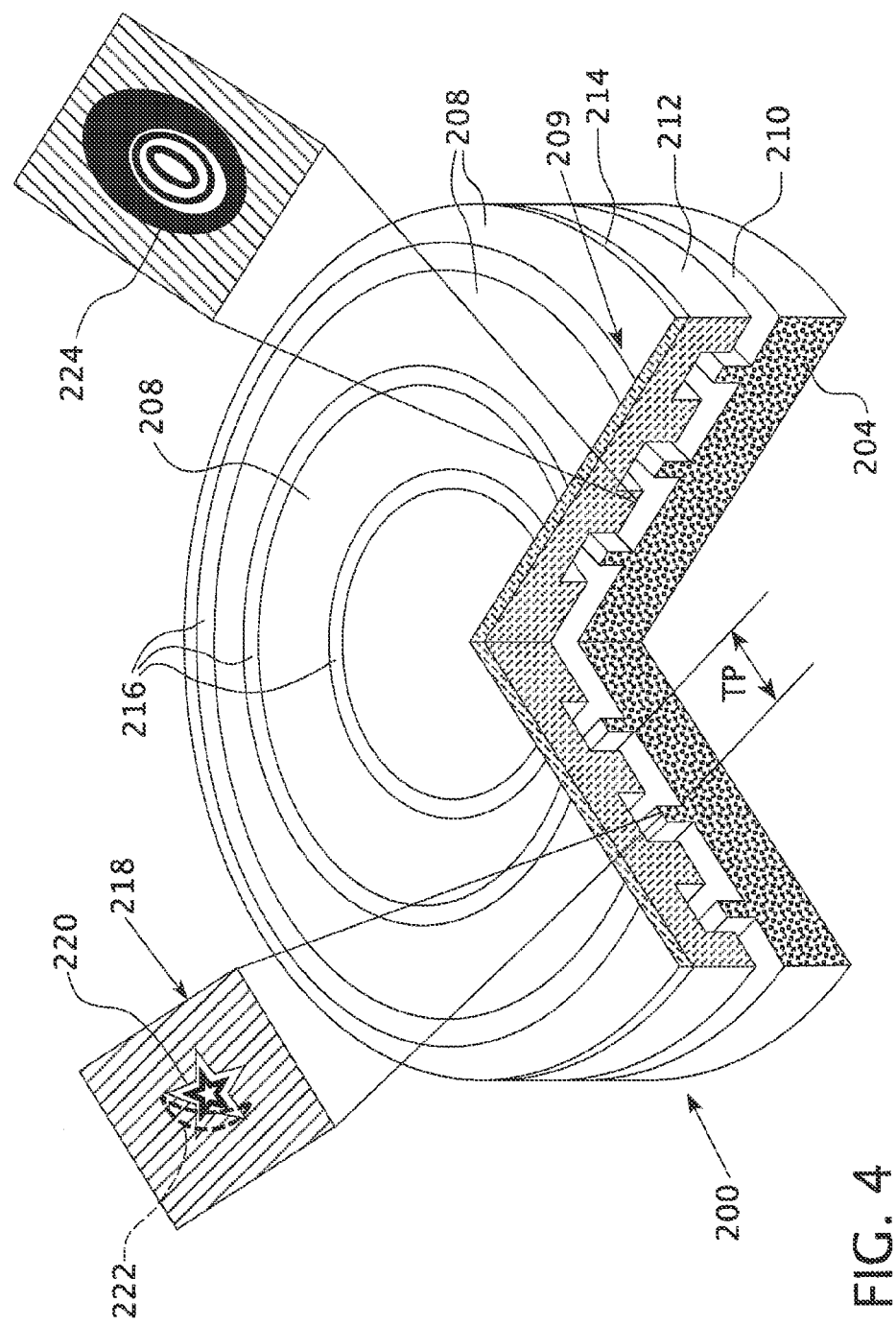
FIG. 4 is a simplified, exaggerated view of an optically variable device disc and a partially sectioned optical disc made in accordance with an embodiment of the invention.
Figure 5:
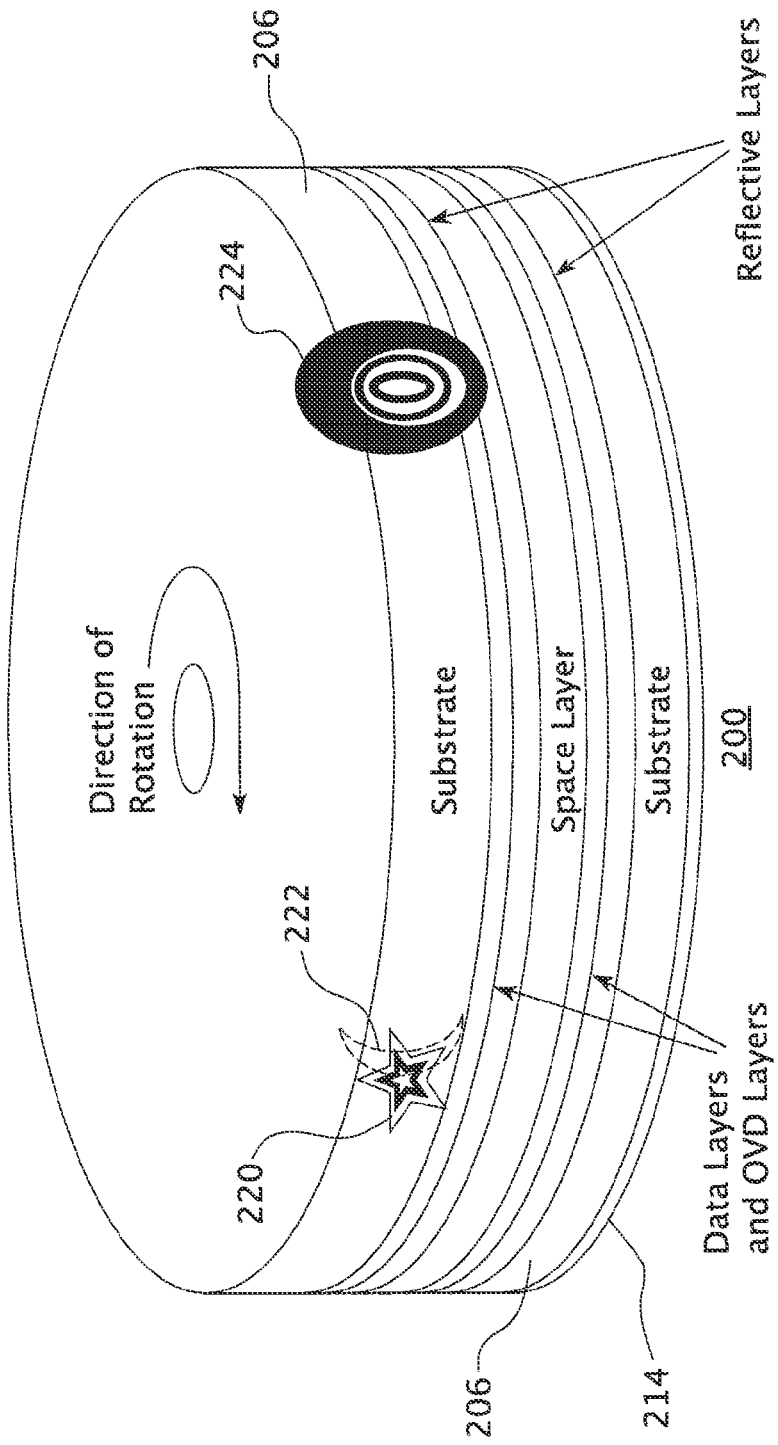
FIG. 5 is a simplified view of one possible disc construction of an optically variable device disc in accordance with an embodiment of the invention.

In the example of FIG. 4, the substrate has a molded pit pattern or groove structure with the OVD in between, integrated into, or completely separate from a data pattern used in optical discs or recordable optical discs. A metal or reflective layer 210 is on top of the pit pattern, and is covered by a separation layer 212. It is then bonded together with an identical substrate to complete the disc 200, as best shown in FIG. 5. However, it will be appreciated that any known or suitable alternative layer combination and configuration, other than the one illustrated in the examples of FIGS. 4, 5, and 6A-6D, could be employed. It will further be appreciated that, as will be discussed, the master 202 of the optical effects (e.g., 216, 218, 220, 222, 224, 225, 226, 227, 228) produced in accordance with the disclosed method and system, can be applied directly to an article, such as the optical disc 200, or alternatively the master substrate 206 can be generated on a separate substrate as an original master relief pattern which is subsequently applied or transferred to any suitable molded or pressed article, such as, for example, stickers, wafers or tape.

Referring again to FIG. 2, the steps of a more detailed example of the method of the invention, as it is applied to master optical discs 200 (FIGS. 4 and 5), is shown. Specifically, in a first step 12, an optical image (see, e.g., image 226 being designed on computer 112 in the example of FIG. 3) is designed. As will be discussed herein, this can be done using, for example, any known or suitable software program. In step 14, optical effects are added to the image design 226, as desired. This information, which generally comprises linear optical features, is then translated in step 16, to suitable layout data for use by the LBR 102 (FIG. 3). Simultaneously, data such as, for example, video and music data, is digitized 18 into digital data 22. In step 30', the LBR 102 exposes OVD fringe-like structures and digital data 22 into a photoresist plate 202. The plate is then processed (e.g., without limitation, developed for photoresist and phase transition materials) in step 40 and, if photoresist is used, a conductive layer is applied in step 42. This can be followed h various known or suitable electroforming steps 50', in order to produce nickel stampers (not shown). Authentic optical discs 200 (FIGS. 4 and 5) are then injection molded from the nickel stampers, in step 52, with digital data 22 and OVDs.

Figure 6A:
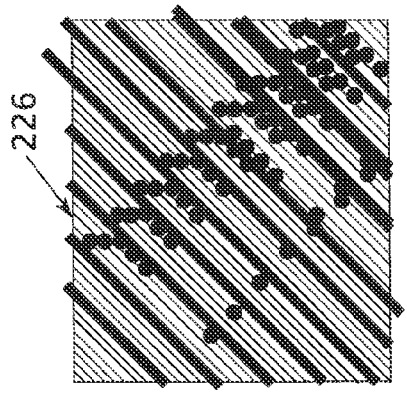
FIGS. 6A, 6B, 6C and 6D are graphic views of four example pit and fringe constructions in accordance with the method of mastering optically variable devices of the invention.
Figure 6B:
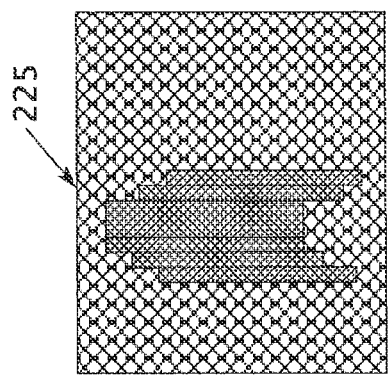
Figure 6D:
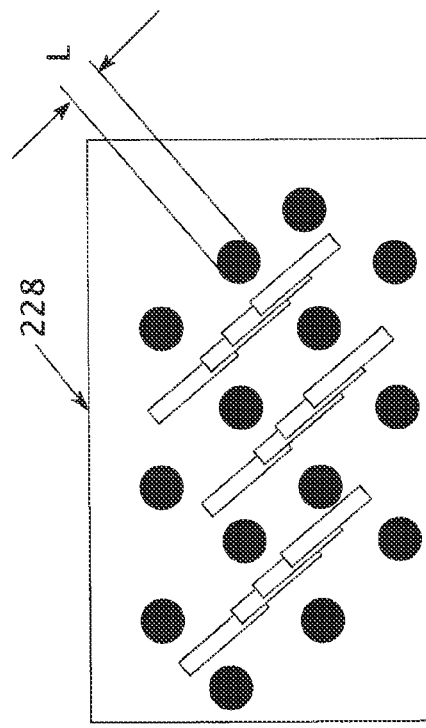
Figure 6C:
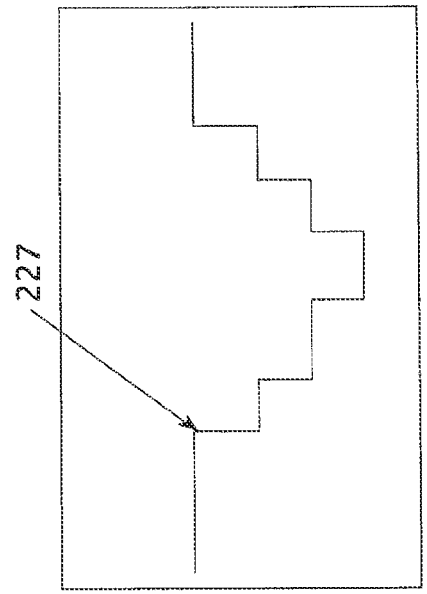

Producing a controlled diffractive effect using the LBR 102 in accordance with embodiments of the invention, involves controlling not only the modulation length (commonly referred to as the pit length), represented by the letter L in OVD 228 in the example of FIG. 6D, but also the manner in which the tracks 209 are laid down in the spiral 216 relative to one another. In other words, the modulation is preferably controlled radially (e.g., across the spiral 216 or generally perpendicularly with respect to the spiral 216), as well as tangentially (e.g., down the spiral 216). For instance, when mastering a conventional DVD, the minimum length is about 400 nm, as limited by the diameter of the beam 106, and the pit width (i.e., the exposure beam width) is about 280 nm. Thus, in order to enable maximum control of the diffractive shape (e.g., 216, 218, 220, 222, 225, 226, 227, 228) by the LBR 102, at least two distinct areas of manipulation are required. Specifically, the length of the diffractive pit (i.e., exposed area) is controlled tangentially, down the spiral 216 or concentric rings, and radially. This can be accomplished in a suitable analog or digital fashion. In the case of a DVD LBR, as previously noted, the minimum size of the diffractive pit element (i.e., pit length) is approximately 280 nm. However, the maximum length can be any suitable length necessary to provide the desired diffractive image. If an analog method is used, the steps can be infinite. Conversely, if a digital system is used, the steps should be as small as possible. It is, therefore, envisioned that steps as small as, or smaller than about 35 nm would be appropriate, although it will be appreciated that courser steps could be used, for example, to produce relatively simple diffraction gratings, without departing from the scope of the invention.

In the radial direction (i.e., in the direction extending between the center and the edge of the disc), control is provided by building up multiple parallel or overlapping exposures (see, e.g., the closely spaced oval gratings of OVD 224 in FIGS. 4 and 5, which are greatly exaggerated and enlarged for simplicity of illustration, and the further gratings 225, 226, 227, 228 in the examples of FIGS. 6A, 6B, 6C and 6D, respectively), and by controlling the space between the exposure tracks 209. By overlapping the exposures (e.g., without limitation, establishing a very tight spiral), the potential for infinite control of the placement of the final diffractive pits is provided. However, in application, because having too much overlap will increase exposure times considerably, it will be appreciated that a more practical spacing regime could be successfully implemented. Specifically, by way of a non-limiting example, the pitch of a DVD is about 740 nm. Decreasing this by one-tenth and thereby providing a step or space between tracks of about 74 nm, should allow for most diffractive situations. It however, be appreciated that much courser or finer steps could be employed without departing from the scope of the invention. Such tangential and radial control allows for precise placement of the desired diffractive pits. It is, however, envisioned that a new encoder (i.e., processor 110) for the LBR 102, in conjunction with proprietary software for use by computer 112, could be developed to effectuate the principles of the invention as outlined herein.

The disclosed system and method will further be appreciated with reference to the following examples, which are provided solely for simplicity of disclosure, and are not limiting upon the scope of the claims appended hereto.

EXAMPLES

In one example, extremely accurate and precise diffractive imagery can be produced in accordance with the disclosed system and method, by first creating a two dimensional micro layout (see, for example, bitmap image 226 on the screen of computer 112 in FIG. 3) of the desired diffractive image. This can be accomplished, in step 12 previously discussed, using conventional XY coordinates. This diffractive image or element is subsequently remapped in step 16, preferably in a vector fashion, in both the tangential direction, and in the radial direction. A practical example of this concept, would be to produce a diffractive picture, made using any known or suitable bitmap program, such as, for example and without limitation, Adobe PhotoShop or Corel PhotoPaint. The image, such as, for example the star-shaped image 226 in the example of FIG. 3, could be, for example, an 8-bit graphic having 256 tones or colors, wherein each of the tones or colors is represented in a look-up table (e.g., palette), and each of the 256 different elements could represent a different diffractive angle. In application, however, it will be appreciated that it is sometimes preferable to have about 255 diffractive angles, with one element of the palette being saved for no exposure. It will also be appreciated that one or more elements of the palette can be saved for pure exposure only, as opposed to the fringes (e.g., line-pairs) used to produce a grating. This would be particularly useful when paired with data for producing watermarks, for example, as will be discussed hereinbelow. Accordingly, it will be appreciated that any suitable number and configuration of angles can be employed in accordance with embodiments of the invention.

Additionally, in step 14, other look-up tables can be used alternatively or additionally in order to apply a wide variety of different known or suitable optical effects and techniques, thereby allowing for a rich range of opt cal effects. In the examples of FIGS. 4 and 5, four different optical effects are shown, a relatively simple spiral diffractive grating 216, amore complex oval-shaped OVD 224, a three-dimensional (3D) star 220 generated in accordance with the process being described, and a two-dimensional (2D) moon-shaped diffractive image 222 (shown in FIG. 5 in phantom line drawing). Additionally, the exemplary star 220 is animated and morphs or transforms into the moon 222, when viewed from a predetermined angle as will be described herein.

More specifically, referring to the star-shaped diffractive image 220 in the examples of FIGS. 4 and 5, which are provided for simplicity of illustration only and is in no way limiting upon the scope of the invention, every pixel in the original bitmap imagery (e.g., star bitmap 226 in FIG. 3) will translate to a holographic pixel (which can be referred to as a hoxel). These hoxels can be a different diffractive images, which may be anything from simple linear gratings to more complex zone plates, or the like. The zone plate can be, for example and without limitation, a simple diffractive lens, or a complex lens, such as a lens that has different spatial frequencies in the "x" direction and the "y" direction. For example, the hoxel can be an individual grating element (i.e., pixel) of a size not normally visible to the human eye, although it will be appreciated that in other embodiments of the invention, special effects of the hoxel are visible. For example, large diffractive lenses (i.e., lenses which are easy seen by the human eye) could be produced in order to provide the OVD with a wide variety of interesting lens effects. Such lenses could have the effect of, for example, a diffractive fresnel lens or any other known or suitable lens, such as, for example and without limitation, an Axicon lens. It will also be appreciated that many hoxels can be combined together in order to produce the final optical picture or effect. For instance, in the example of FIGS. 4 and 5, the star-shaped diffractive image 220 could be provided with an optical effect of appearing to twinkle when viewed from predetermined angles. Accordingly, the production of zone plates (e.g., without limitation, diffractive lenses) in accordance with the invention, allows for the building of three-dimensional (3D) shapes, such as star 220. Hence, two-dimensional (2D) holography, three-dimensional (3D) holography, stereo-pairs, which would allow for simple 3D imagery, and stereograms, which will allow movement in the imagery, are all contemplated by embodiments of the invention.

Images and effects can also be produced from vector programs such as, for example, and without limitation, Adobe Illustrator or Corel Draw. Pure vector files can either be used on their own to produce precise shapes, or in combinations with bitmap programs to give unique effects. The advantage of vector programs is that they work with mathematic coordinates, as opposed to a raster grid, thereby giving a smoother end result.

To provide control of color, the spatial frequency of the different hoxels needs to be carefully altered to play back natural colors at a predetermined viewing angle. In this manner, simple calculations allow for full color to be had at a wide range of different viewing angles. More specifically, to produce a desired color changing effect (e.g., without limitation, going from one color to another) that is viewed by rotating the disc or other suitable article which has been authenticated in accordance with the invention, different spatial frequencies in the "x" and "y" directions are employed. Moreover, an even further color change feature could be optionally provided by employing oval-shaped gratings, such as those shown in profile 227 in FIG. 6C and the oval-shaped OVD 224 of FIGS. 4 and 5, It will be appreciated that for simplicity of illustration, the size of the steps in profile 227 and the oval OVD 224, are greatly exaggerated and thus are not to scale. In actuality, they are contemplated as being sub-micron, although they could be larger. This provides a transition of color between the color in the "x" direction and color in the "y" direction. Thus, it will be appreciated that the method of mastering OVDs using an LBR 102 in accordance with the invention could be used to implement any suitable combination of optical effects.

For instance, in one example, a diffractive image can be made from an 8-bit grayscale file with the grays representing different diffractive angles, previously discussed. in this example, black represents the zero tone value in the look-up table wherein there is no exposure, and the other 255 tonal values represent evenly spaced different angles of diffraction. The spatial frequency of the grating, which is defined by the distance between one exposed width and one unexposed width (i.e., a pair of grooves or lines 209), is on the order of one micrometer (micron), although it will be appreciated that in other embodiments of the invention, the width could be any suitable value from greater than 5 microns to about 105 nm. It will also be appreciated that, in addition to the 8-bit described hereinabove, 24-bit, 32-bit, or any other known or suitable encoding methods or programs are also within the scope of the invention. It will still further be appreciated that color 8-bit, or larger, files could be employed instead of the aforementioned grayscale file.

In another example in accordance with the invention, a full color diffractive picture could be produced by starting with a full color bit-map picture and then separating the color using any known or suitable bit-map software program such as, for example and without limitation, Adobe Photo Shop or Corel Photo-Paint. Thus, in the example, of FIGS. 4 and 5, the star diffractive image 220 would originate as a full color bitmap image 226 generated on the computer 112, as shown in FIG. 3. The resulting grayscale separations would then be used to map onto grids of red, blue, and green hoxels. Next, the hoxels are arranged in any number of suitable different orientations, with each element preferably being smaller then the human eye can perceive. For simplicity of illustration, it will be appreciated that this aspect of the layout of the color elements is generally similar to that seen on color televisions. As each color zone can be any of the colors which can be generated by the particular grating steps employed, a vast number of different color regimes are contemplated by the invention. Thus, referring again to the example of star-shaped image 220, in addition to appearing to twinkle as previously discussed, the color or tone of the star-shaped image 220 could also change when viewed from different angles, and/or the color of the star 220 and the moon 222 could be different. In this manner, in addition to other optical effects, the foregoing combination of OVDs could, for example, provide the appearance of the visible surface of the optical disc 200 turning from twilight (i.e., a relatively light gray) to nighttime (i.e., a darker gray or black), and the star 220 could be yellow and change into a shining white moon 222. It will, of course, be appreciated that the foregoing is hut one of the essentially limitless number of possible OVD masters (e.g., 202) that can be produced in accordance with the invention.

In yet another example in accordance with the invention, full color diffractive images can be produced by breaking a full color photograph into small hoxel elements and then mapping each element to a look-up table containing the whole spectrum. This process is controlled by altering the spatial frequency of the hoxels. To produce certain colors which are outside of the spectrum, it will be necessary to break the hoxels into smaller elements to allow two or more spectral colors to be combined and thereby provide the final desired color. It will be appreciated that other color regimes are quite practical, such as, for example, dynamic color zones, which allow the color of individual color elements making up the final color image to dynamically alter (e.g., change spatial frequency) within the same element space, thereby allowing fur bright imagery.

In yet another example, an Aztec hologram could be created using the exemplary method of mastering OVDs in accordance with the invention. Among other attributes, Aztec holograms give the potential for full color, stable imagery. In this example, a complex step grating would be exposed in step 30 and 30'. Thus, the resolution requirement would go up considerably. It is contemplated that the LBR system 100 would, therefore, need to have a resolution of at least about 150 nm, or more.

In a still further example, a stereogram can be made from a number of 2D images. Stereograms are often used to make a stereo 3D image which can be, although it is not required to be, animated, such as the exemplary star stereogram 220 in the example of FIGS. 4 and 5. Such stereograms can also be full color at a predetermined viewing angle. Moreover, stereograms can also be used to animate 2D images, such as the moon-shaped image 222 in FIG. 5. Such stereograms can be calculated using the principles for two-dimensional diffuse holography and can be based on a number of overlapping two-dimensional images, although it will be appreciated that any other known or suitable variation which can be utilized without requiring diffuse imagery, could also be employed. Like the other diffractive images described hereinabove, these images could he first produced on the computer 112 using any known or suitable 3D animation program, such as, for example and without limitation, Autodesk 3ds Max. Such programs give the ability to generate (e.g. without limitation, sculpt) a 3D model, as opposed to the 2D star model 226 shown on the screen of computer 112 in the example of FIG. 3. The model may, therefore, move (i.e., animate) in many different ways, including morphing or transforming into an entirely different shape, like the exemplary 3D star 220 which morphs into the 2D moon 222, in the example of FIG. 5. Also, conventional video or film footage may be used to produce the stereograms.

Accordingly, it will be appreciated that the disclosed method and system of mastering OVDs are capable of providing an essentially limitless variety of colors, shapes, dimensions, movements (e.g., without limitation, animations), and/or any other known or suitable optical effects, and combinations thereof. Such effects may be grey scale, or full color, as previously discussed. It will still further be appreciated that the disclosed color control and animation capabilities provide the ability to make animated movie OVDs. This could be accomplished, for example, by interlacing many frames, or off-setting the frames from each other using slightly different reference angles.

Additionally, in order to increase the security and the aesthetic appeal of the final product (e.g., optical disc 200), the stereogram could morph into an entirely different effect, such as, for example and without limitation, a simple grating, or text, a symbol, or a message for example, could appear at a predetermined viewing angle. In this manner, the disclosed system and method provide a vast improvement over known conventional OVD methods and systems, which do not easily allow seamless blending of different optical effects, and techniques for generating the same. Hence, in accordance with embodiments of the invention, any known or suitable optical technique or effect can be produced, and can be morphed (e.g., changed or dissolved) into any other known or suitable optical technique or effect or combination thereof, thereby providing essentially seamless transformations among combinations of optical effects. In other words, an optical disc 200, or other suitable product which has been authenticated in accordance with the disclosed OVD mastering method and system 100, can have a first optical effect (e.g., without limitation, an animated 3D picture such as 3D animated star 220), which is capable of smoothly changing or transforming (i.e., transitioning) into one or more other (i.e., different) optical effects (e.g., without limitation, another animated 2D or 3D image, or an unanimated image or effect, such as the unanimated 2D moon 222 of FIG. 5).

In a still further example of the invention, optical black effects may be provided. Optical. black effects have the effect of capturing tight, in order to give a dark look with a bright blue or blue/green grating. This optical effect is typically seen at an oblique angle (i.e., an angle which is neither perpendicular nor parallel with respect to the plane of the optical disc), and is achieved by having very fine spatial frequencies and a high aspect ratio between the spatial frequencies. In other words, the depth is much greater than the spatial frequency. A still further variation is produced by having a cross-hatch grating (not shown), which provides an optical effect commonly referred to as a "moth eye" effect (not shown).

The disclosed OVD mastering system 100 and associated method can also provide Inner Mirror Band (IMB) imagery, outer Mirror Band (OMB) imagery, and any suitable combination of IMB and OMB imagery. IMB imagery is an optical effect that is disposed on the inside of the data (e.g., the digital data recorded on the optical disc), whereas OMB imagery is an optical effect anywhere outside of the data area. Mid band OVD effects are also possible whereby there is a break in the data and an OVD is inserted, although special mastering would be required to allow optical readers to "jump over" the break in the data. The method of the invention can also interlace OVDs with the data (e.g., without limitation, running a parallel track with the data) either throughout an entire data recording or at one or more predetermined areas of the data recording (see, e.g., track pattern 228 in the example of FIG. 6D). Such interlacing with the data provides a very effective watermark effect, thereby further resisting counterfeiting. This system would be particularly suitable for injection molding the optical imagery into optical discs 200 as one layer among multiple layers of the disc 200, such as, for example and without limitation, a layer 206 in a DVD9 disc 200 such as the one shown in the example of FIG. 4. A DVD9 disc has a single-sided, dual-layer data construction, as shown in FIG. 4. It will, however, be appreciated that the invention could also be employed with any other known or suitable optical disc, expressly including but not limited to, a DVD10 (single-layer, dual-side), a DVD14 (a dual-side, one single layer and one dual-layer component), a DVD18 (dual-sided dual-layer), and the like.

Masters can also be produced in accordance with embodiments of the invention, for a so-called edge-to-edge layer on an optical disc. This is achieved by adding a lacquer layer, such as layer 214, for embossing as discussed, for example, in U.S. Pat. No. 6,160,789 to N. C. Abraham, which is hereby incorporated by reference herein. By way of example, an IMB OVD utilizing any of the aforementioned techniques, or any other known or suitable optical technique, can be produced and combined with only data (i.e., digital music or video data and no OVD) which, for example, continues until a predetermined location near the middle of the disc where the track pitch is then altered (e.g., increased), and a parallel OVD track is introduced for a predetermined interval. The parallel OVD track is then stopped, and the data goes back to its original track pitch. In this manner, an OVD watermark effect can be produced in the center of the disc.

Embodiments of the invention further provide the potential to produce continuous grating streams which may or may not be courser than the digital data pits being made on the optical disc. This allows for the customization of each individual disc using, for example, a laser to cut or etch small amounts of digital data by eradicating grating elements and producing a binary stream. More complex grating structures, such as, for example a blazed grating (commonly referred to as a saw-tooth), could also be produced. Among other attributes, such a saw-tooth grating can be extremely efficient at predetermined wavelengths. However, an important consideration when dealing with more complex relief profiles, is the thickness of photoresist or other suitable medium used to record the data pits and OVD. Specifically, in order to maximize diffraction efficiency, the thickness of the photoresist generally needs to be much greater than the thickness of known conventional photoresists used for optical discs. By way of example, CD resist coatings are generally about 130 nm thick, DVD coatings are about 110 nm thick, and HD-DVD coatings are about 67 nm thick. Holographers on the other hand, often have resist coating thicknesses of about 1 micron to about 1.5 microns (about 1,000 urn to about 1,500 nm), and the fringe depths are often only about 0.3 microns to about 0.5 microns but, additional resist allows for greater exposure latitude. Relatively simple gratings have a much greater diffraction efficiency if the coatings are thicker than is usual for known conventional optical discs. Moreover, for some techniques such as, for example, the aforementioned blazed gratings, optical black imagery, and Aztec imagery, such thicker coatings are almost always essential. Hence, it will be appreciated that there are typically limitations on what techniques can be suitably employed in conjunction with data. However, when the plates are used for injection molding (see, for example, step 52, previously discussed), casting or embossing as a separate layer in an optical disc, or when masters are being made for other forms of duplication, such limitations generally do not exist.

Another possibility presented by the invention is to alter the thickness of the photoresist across the master in order to give one thickness of resist for the digital data, and another for the OVD. Any known or suitable method could be used to control the thickness, such as, for example and without limitation, selectively exposing the area of the resist via contact copying with a mask (i.e., with blue or UV light), projecting the mask, or using the LBR 102 to expose the resist so that when initially developed, it removes sufficient resist so as to give the desired thickness for recording data. Alternatively, the OVD and the digital data can be separately exposed, and subsequently recombined using casting or any other known or suitable technique. It will, therefore, be appreciated that the disclosed system 100 and method are adapted to provide variable exposure wherein any of a number of parameters such as, for example, focus of the beam 106, frequency, modulation intensity, beam shape and beam deflection, can be controlled (e.g., varied) as desired to achieve the desired optical effect. Moreover, it will also be appreciated that photoresist is, in some cases, not necessary for mastering of the data pits. For example, and without limitation, known polymer and phase change systems used for Blu-Ray, and occasionally for CD and DVD mastering, allow the recording of data pits and, therefore, could be used in conjunction with the system 100 and associated method of the invention to master the OVDs.

As previously noted, it will be appreciated that optical imagery in accordance with embodiments of the invention, though produced on a LBR 102, is in no way limited only to optical disc applications. Conversely, embodiments of the invention provide a very powerful OVD mastering system 100 and method which may be used to make masters that can be employed in any application where masters made by known conventional holographic relief techniques or electronic beam (commonly referred to as "e-beam") originations are typically employed, and in any other known or suitable location. Moreover, OVDs in accordance with embodiments of the invention can be duplicated, if desired, using known conventional embossing, casting or injection molding systems.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of mastering a number of predetermined optically variable images, the method comprising:
designing an optical image using a computer;
adding optical effects to the optical image;
translating the optical image and optical effects to spiral compatible layout data suitable for use by a laser beam recorder; and
using the layout data and the laser beam recorder to expose fringe structures corresponding to the optical effects into a rotating prepared substrate,
wherein the laser beam recorder uses a focused laser beam spot o create spiral exposure tracks on the rotating prepared substrate,
wherein at least two successive exposure tracks overlap with each other, and wherein the fringe structures include at least one of linear diffraction gratings and zone plate structures.

2. The method of claim 1 wherein the prepared substrate comprises at least one of a photosensitive layer, a thermal activated layer, a photoresist coating, a phase change material, a polymer layer, and a nitrocellulose lacquer.

3. The method of claim 2 further comprising varying the thickness among said at least one of the photosensitive layer, the thermal activated layer, the photoresist coating, the phase change material, the polymer layer, and the nitrocellulose layer.

4. The method of claim 2 wherein the thickness of said at least one of a photosensitive layer, a thermal activated layer, a photoresist coating, a phase change material, a polymer layer, and a nitrocellulose lacquer is between about 67 nanometers and about 1,500 nanometers.

5. The method of claim 1 further comprising varying at least one of the laser beam's focus, frequency, modulation intensity, deflection and shape, thereby modulating the laser beam in a predetermined manner in order to selectively expose said spiral exposure tracks on the prepared substrate.

6. The method of claim 5 further comprising:
the prepared substrate being generally circular in shape, and
modulating the laser beam in both a radial direction and a tangential direction with respect to the exposure tracks.

7. The method of claim 6 further comprising:
forming a plurality of optically variable elements within said spiral exposure tracks, and
controlling at least one of the spacing among the optically variable elements and overlapping of the optically variable elements in the radial and tangential directions in order to produce a desired optical effect.

8. The method of claim 1 further comprising:
applying a conductive layer to the exposed prepared substrate, and
electroforming the exposed prepared substrate to produce a stamper for replication of the optically variable device.

9. The method of claim 8 further comprising:
employing the stamper to replicate an article by a process selected from the group consisting of injection molding, casting and embossing.

10. The method of claim 9 further comprising:
the article being an optical disc having a number of layers, wherein at least one of the layers includes at least one optically variable device.

11. The method of claim 1 further comprising:
providing a processor, and
programming the processor in order to automate selected steps of the method of mastering the predetermined optically variable image.

12. The method of claim 11 further comprising:
employing the processor to control the laser beam, in order to expose the prepared substrate.

13. The method of claim 1 further comprising:
digitizing data selected from the group consisting of video data, music data, and computer data to form digital data, and
interlacing the digital data in combination with the optical image and optical effects, using the laser beam recorder.

14. The method of claim 1 wherein the optical effects include at least one non-diffractive optical effect.

15. The method of claim 1 wherein the optical effects include at least one optical effect selected from the group consisting of interlaced images, a two-dimensional hologram, and an Aztec hologram.

16. The method of claim 1 wherein the predetermined optically variable image comprises a machine-readable optical device.

17. The method of claim 1 further comprising:
combining at least two predetermined optically variable images by interlacing and exposing them together.

18. The method of claim 1 further comprising:
changing the spatial frequencies of a number of preselected grating elements, and
dynamically assigning colors from a spectrum to preselected spatial points in the optically variable image in order to produce different color effects.

19. The method of claim 1 wherein areas of the prepared substrate in which the fringe structures corresponding to the optical effects are exposed do not contain any readable recorded digital data.

20. The method of claim 1 wherein the prepared substrate is selected from the group consisting of glass and a silicon wafer.

* * * * *